Sept. 9, 1952 C. S. PRENDERGAST ET AL 2,609,754
PUMP AND MOTOR
Filed Sept. 21, 1951 4 Sheets-Sheet 1
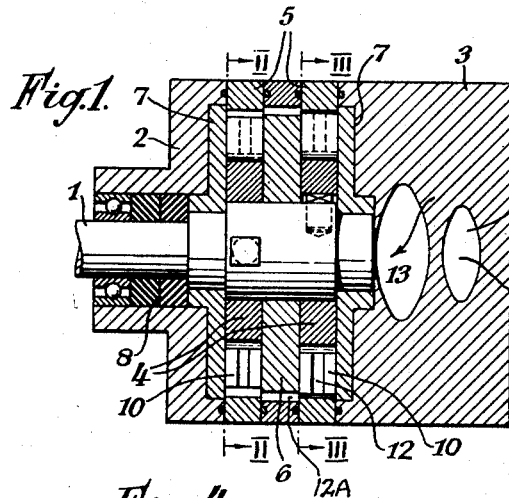
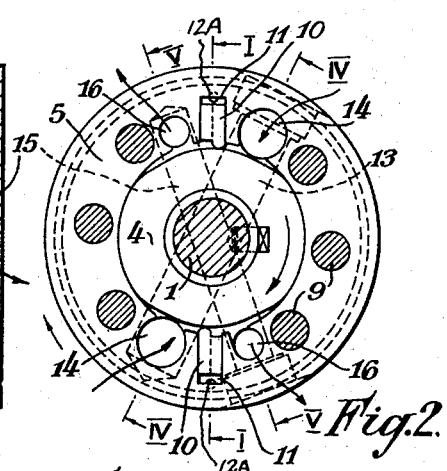
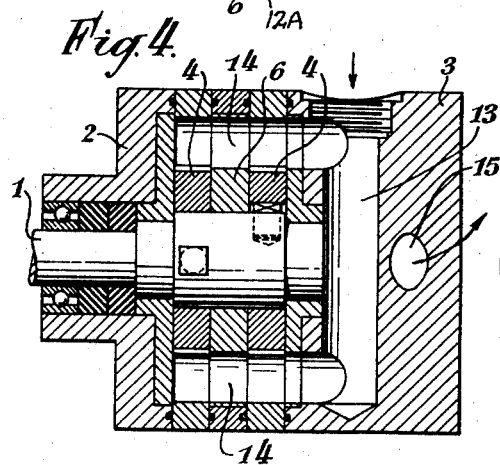
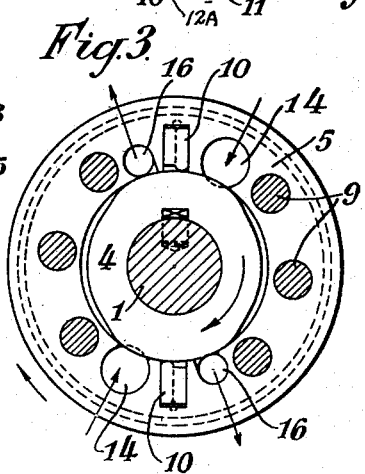
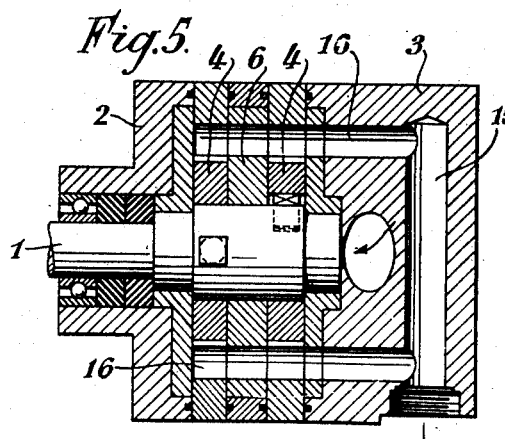
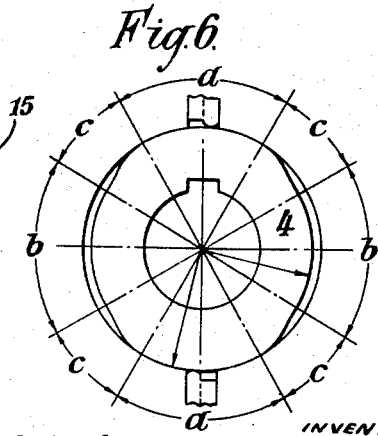
INVENTORS
CHARLES SCOTT PRENDERGAST,
RICHARD SAMUEL PRENDERGAST,
GODFREY WILLIAM BEAUMONT DIXEY,
HAMILTON GORDON,
John B. Brady ATTORNEY Sept. 9, 1952　　　C. S. PRENDERGAST ET AL　　　2,609,754
PUMP AND MOTOR
Filed Sept. 21, 1951　　　　　　　　　　　　　　　　4 Sheets-Sheet 2
Fig. 7.
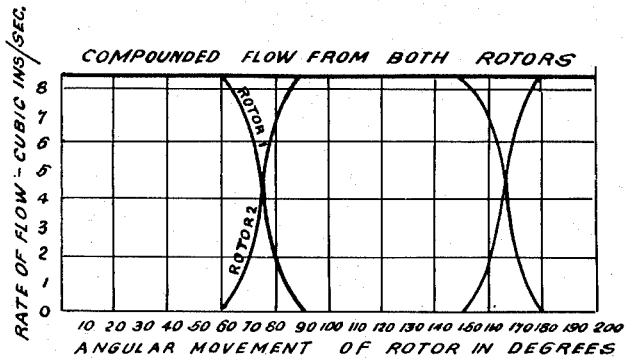
Fig. 8.
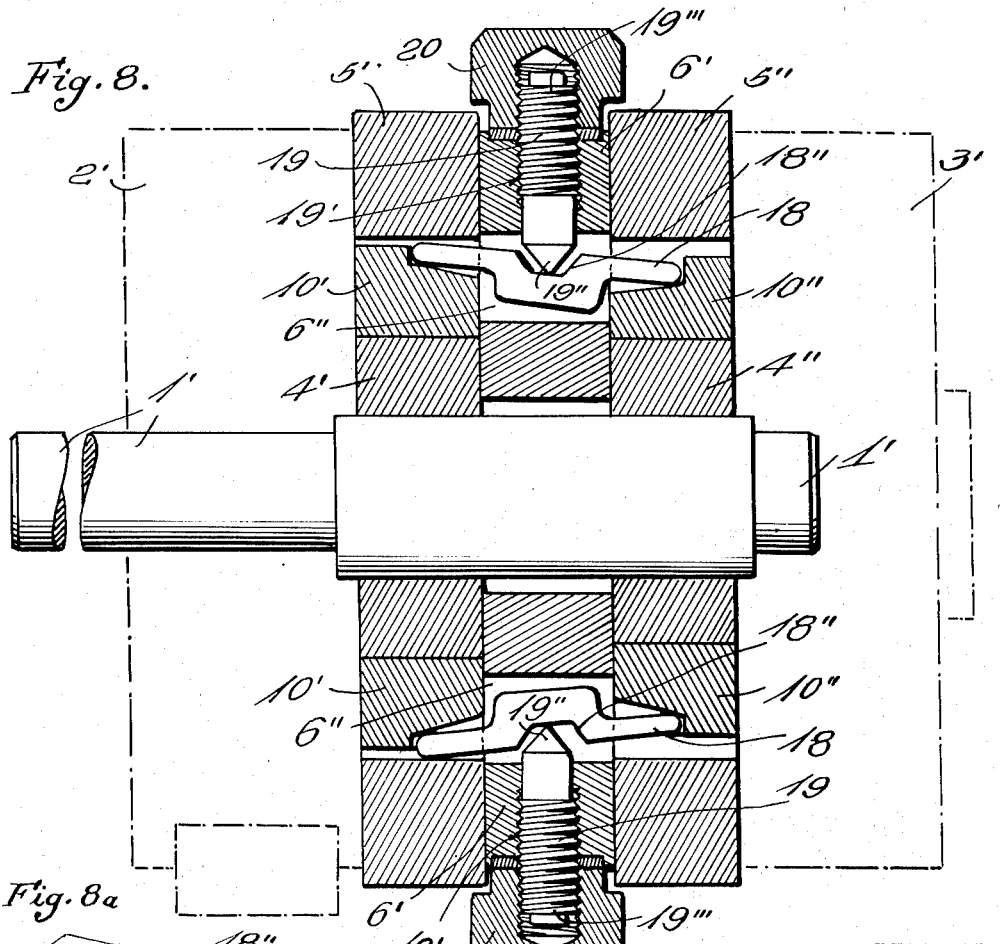
Fig. 8a.
Fig. 8b.
INVENTORS
CHARLES SCOTT PRENDERGAST,
RICHARD SAMUEL PRENDERGAST,
GODFREY WILLIAM BEAUMONT DIXEY,
HAMILTON GORDON,
BY John B. Brady
ATTORNEY

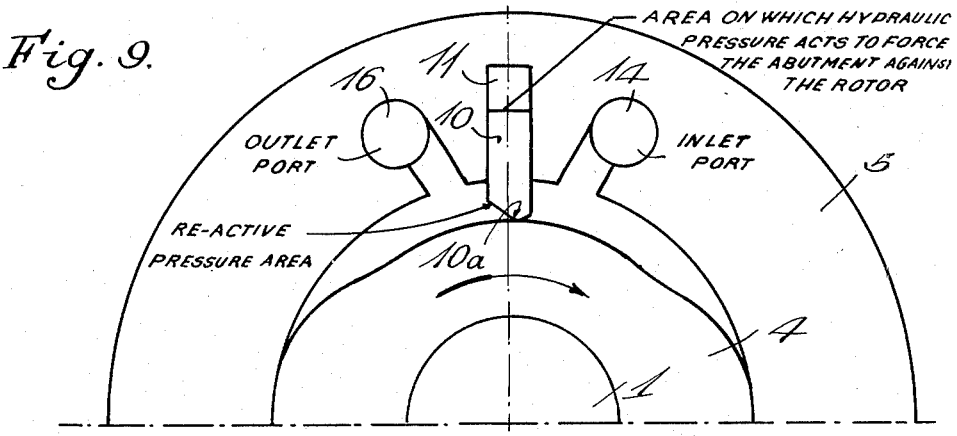
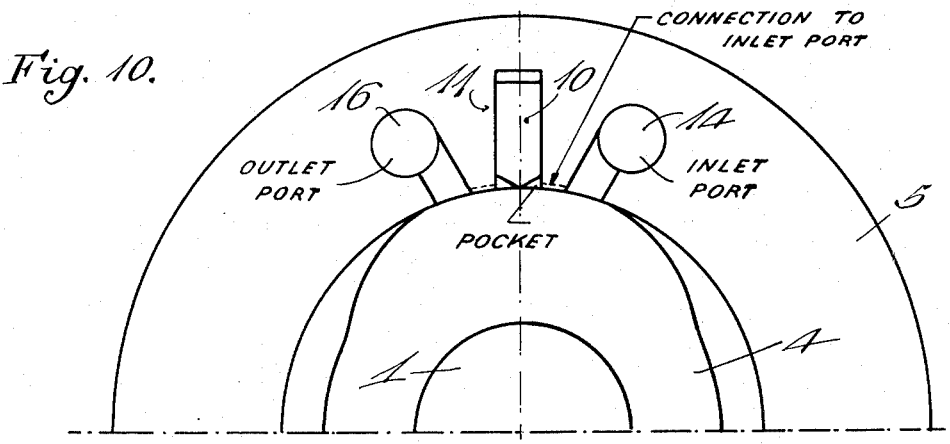
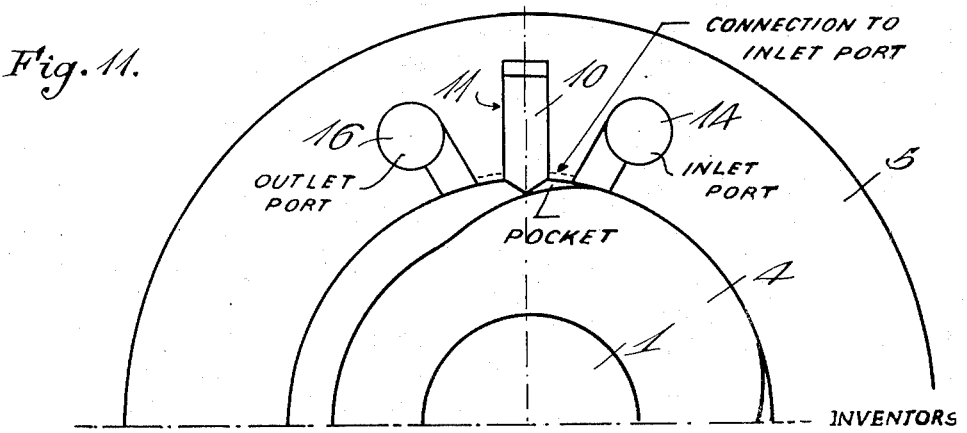

Sept. 9, 1952  C. S. PRENDERGAST ET AL  2,609,754
PUMP AND MOTOR
Filed Sept. 21, 1951  4 Sheets-Sheet 4

Fig. 12.

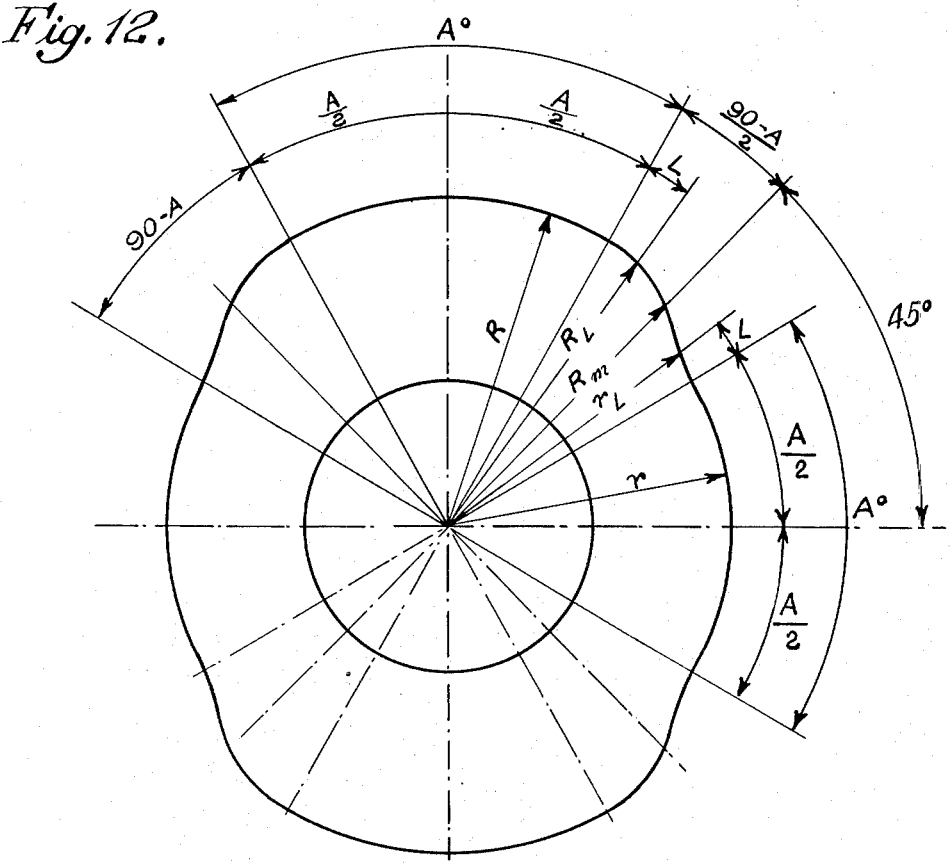

$A$ = ANGULAR LENGTH OF EACH CIRCULAR ARC IN DEGREES
$R$ = RADIUS OF MAJOR CIRCULAR ARC
$r$ = RADIUS OF MINOR CIRCULAR ARC
$R_m$ = RADIUS AT 45 DEGREES TO A RADIAL LINE BISECTING EITHER ADJACENT CIRCULAR ARC
$R_L$ = RADIUS AT L DEGREES FROM END OF LARGE CIRCULAR ARC
$r_L$ = RADIUS AT L DEGREES FROM END OF SMALL CIRCULAR ARC $$R_m = \frac{R+r}{2}$$

$$R_L = R - \frac{R - R_m}{\left(\frac{90-A}{2L}\right)^2}$$

$$r_L = r + \frac{R - R_m}{\left(\frac{90-A}{2L}\right)^2}$$

$$R + r = R_L + r_L$$

INVENTORS
CHARLES SCOTT PRENDERGAST,
RICHARD SAMUEL PRENDERGAST,
GODFREY WILLIAM BEAUMONT DIXEY,
HAMILTON GORDON,
BY
John B. Brady
ATTORNEY Patented Sept. 9, 1952

2,609,754

UNITED STATES PATENT OFFICE 2,609,754

PUMP AND MOTOR

Charles Scott Prendergast, Eashing, Richard Samuel Prendergast, Elstead, Godfrey William Beaumont Dixey, London, and Hamilton Gordon, Elstead, England Application September 21, 1951, Serial No. 247,712
In Great Britain September 14, 1948

4 Claims. (Cl. 103—4)

Our invention relates broadly to pumps and motors and more particularly to an improved rotary pump or motor of the kind having a series of stator chambers, a series of phase-displaced rotors one in each stator chamber, and movable abutments between the stator chambers and the rotors, and wherein the stator chambers and the rotors are relatively profiled to bring about reciprocal rates of acceleration and deceleration of the movable abutments as the rotors rotate, whereby the total instant fluid displacement of the series is practically uniform.

This application is a continuation-in-part of our application Serial No. 99,702, filed June 17, 1949, now abandoned for Improvements Relating to Pumps and Motors.

One of the objects of our invention is to provide a construction of rotary pump or motor having a high degree of efficiency and reliability.

Another object of our invention is to provide a construction of rotor for rotary pump or motor which is formed on predetermined contours including interconnected curves, one portion of which operates in coaction with associated parts of the rotor pump or motor at a constant rate of acceleration and another portion of which operates in association with the said parts of the rotary pump or motor at a constant rate of deceleration.

A further object of our invention is to provide a new and improved rotary pump or motor, of the movable abutment type, comprising a series of stator chambers with a series of rotors phase-displaced at 90 degrees, there being one rotor to each stator chamber, and two movable abutments, diametrically opposed, contained between each stator chamber and rotor, inlet and discharge ports on either side of each abutment being isolated from each other by sealing contact of the abutments with the stator and rotor.

Other and further objects of our invention reside in the construction of a rotor for a rotary pump or motor, the contour of which is precalculated according to mathematical formulae for insuring mass production of the rotors at relatively low cost and for obtaining reliable and uniform operation of pumps or motors in a large production program as set forth more fully in the specification hereinafter following by reference to the accompanying drawings, in which:

Figure 1 is a vertical longitudinal sectional view through a fragmentary portion of a multiple chamber pump embodying our invention, the view being taken on line I—I of Fig. 2; Fig. 2 is a transverse sectional view taken on the line II—II of Fig. 1; Fig. 3 is a transverse sectional view taken on line III—III of Fig. 1; Fig. 4 is a fragmentary longitudinal sectional view taken on line IV—IV of Fig. 2; Fig. 5 is a fragmentary longitudinal sectional view taken on line V—V of Fig. 2; Fig. 6 is a view of one of the identical rotors in the rotary pump or motor in our invention; Fig. 7 is a curve diagram illustrating the compounded flow displacement controlled by the rotors of the rotary pump or motor illustrated in Figs. 1-6; Fig. 8 illustrates a modified form of rotary pump or motor embodying our invention in which the abutments in one stator chamber are connected to aligned abutments in the other stator chamber through lever members for controlling the mutual coaction thereof; Figs. 8a and 8b are perspective views showing the shape of the levers and abutments used in the structure of Fig. 8; Fig. 9 shows the coaction of one of the abutments with the rotor of the pump where the minor circular arc of the rotor is in contact with the sliding abutment; Fig. 10 shows the condition where the major circular arc of the rotor is in contact with the sliding abutment; Fig. 11 shows the condition in which the sliding abutment is in contact with the curves of the rotor intermediate the major and minor circular arcs thereof; and Fig. 12 is a diagram showing the manner of laying out the curve contours for the rotor in accordance with the principles of our invention.

Referring to Figs. 1 to 6 reference character 1 indicates a shaft journalled in end housings 2 and 3 of the fluid casing, the shaft having keyed thereon two similar rotors 4 (of special profile hereinafter particularly described) phase-displaced at 90 degrees and surrounded by stator elements 5. Spacer plate 6 separates on stator and rotor from the other stator and rotor while the housing members, which include liners 7, contain them at the ends. The described parts are held assembled by bolts 9, shown in the cross sectional views Figs. 2 and 3, but omitted from the longitudinal sectional views for the sake of clearness, which pass through holes formed through the end housings 2, 3, the liners 7 and stator element 5, and the spacer 6. The bore of each stator element is cylindrical in shape.

Each of the two stator elements has two diametrically opposed abutments 10 which slide in radially extended recesses 11 in the stator elements, the recesses in one stator coinciding radially and circumferentially with the recesses in the other stator and disposed in a plane extending through the shaft 1. The outer ends of the recesses in one stator are connected to the outer ends of the recesses in the other stator by means of holes 12A through the spacer member 6. Slots 12 in the rear of the abutments connect the outer ends of the recesses to the bore of the stator. These sliding abutments bear constantly on the perimeters of the rotors under fluid pressure on their outer end surfaces. Owing to the special form of the phase-displaced rotors the fluid pressure remains constant as the fluid displaced by one pair of abutments moving outwards is at all times exactly absorbed by the aligned pair of abutments moving inwards, by means of holes 12A in the spacer plate 6. Initial pressure at the outer ends of the abutments is obtained through slots 12 in the rear of the abutments 10. If desired slots 12 can be omitted as initial pressure can be obtained through the sliding clearance allowed for the abutments in the recesses.

Extending diametrically into the end housing member 3 is a fluid inlet duct 13 shown more particularly in Figs. 2 and 4 which communicates with two sets of aligned holes in the said end member 3, the liner 7, the stators 5, and the spacers 6, these aligned holes forming two diametrically opposed fluid inlet passages 14 each of which opens radially into the stator chambers in advance of the sliding abutments in respect to the rotation of the shaft 1. Also extending diametrically into the housing member 3, as shown in Figs. 2 and 5, is a fluid discharge duct 15 which communicates with two diametrically opposed fluid outlet passages 16 each of which communicates radially with the stator chambers in the rear of the sliding abutments.

It will be understood that since each rotor 4 co-acts with two sliding abutments 10, each of which is disposed between a fluid inlet 14 and a fluid outlet 16, two identical displacement capacities are afforded in each stator, each of which capacities is swept twice during one revolution of the rotor. Such an arrangement has the advantage that it automatically provides hydraulic balance of each rotor and consequently of the driving shaft.

The perimeter of each rotor is formed by a major and a minor pair of diametrically opposed arcs, as shown at $a$ and $b$ in Fig. 6, all arcs being subtended by equal angles of less than 90 degrees, and the chords of the pair of major arcs being disposed at 90 degrees to the chords of the pair of minor arcs. Four joining curves $c$, connecting adjacent major and minor arcs $a$ and $b$ and forming a smooth junction with each arc, complete the perimeter. The radii of the major arcs are each almost equal to the radius of the stator chamber, the difference between them being sufficient to allow for running clearance. The radii of the minor arcs are smaller than the radii of the major arcs by a predetermined amount, this amount being a governing factor in the cubic capacity of the pump or motor. The radius of a joining curve at the point mid-way between adjacent major and minor arcs is the mean of the radius of the major arc and the radius of the minor arc. The radii of the remainder of the joining curve can be determined as follows: The difference between the radius of a major arc and any radius of the joining curve between the adjacent end of the major arc and the mid-way point of the joining curve varies with the square of the angle contained between the radius and the junction point of the joining curve and the major arc. For example—if this difference is $D$ at one degree from the end of the major arc, it should be $4 \times D$ at two degrees from the end of the major arc, and $9 \times D$ at three degrees from the end of the major arc. The difference between any radius $r$ of the joining curve and the radius of a minor arc between the midway point of the joining curve and the adjacent end of the minor arc varies with the square of the angle contained between the radius $r$, and the radius at the junction point of the joining curve and the minor arc. For example—if this difference is $d$ at one degree from the end of the minor arc, it should be $4 \times d$ at two degrees from the end of the minor arc and $9 \times d$ at three degrees from the end of the minor arc. If this is followed in profiling the rotors 4, the abutments 10 in contact with the rotors will travel outwards for the first half of their movement at a constant rate of acceleration and for the second half of their movement at a constant rate of deceleration. During the same periods the aligned abutments in contact with the other rotor will travel inwards for the first half of their movement at a constant rate of acceleration and for the second half of their movement at a constant rate of deceleration. These exactly reciprocal rates of movement determine that the fluid displacement of an abutment when moving outwards is at all times equal to the fluid absorption of an abutment moving inwards, thus ensuring continuous contact at all times between the abutments and the rotors. Having provided continuous contact between the abutments and the rotors by this form of profile it is found that the combined instant displacement produced by rotation of the two complementary rotors is practically constant.

Fig. 7 shows the characteristic curves for the compounded flow of two coacting rotors. In another form of our invention as shown in Fig. 8 we have shown a modified assembly including housing members 2' and 3' in which shaft 1' is journaled and wherein the abutments 10' in one stator chamber 5' are connected to the aligned abutments 10'' in the other stator chamber 5'' by levers 18 which are arranged to pivot half-way between the abutments in the spacer plate 6'. The shape of levers 18 is illustrated more clearly in Fig. 8a and the shape of each abutment is shown in Fig. 8b.

In order that this arrangement can operate with the abutments held positively in continuous contact with the rotors 4' and 4'' by means of the pivoted levers 18, it is essential that the joining curves connecting the major and minor arcs should give reciprocal rates of acceleration and deceleration to the abutments. This is ensured by the rotor construction previously described. If desired the fulcrums 19 of the levers 18 may be made adjustable by screw threads or other suitable means formed in spacer plate 6' to bring the abutments into contact with the rotors 4' and 4''. The spacer plate 6' is apertured at 6'' to enable the levers 18 to pass laterally therethrough for engaging opposite ends of abutments 10' and 10'' in the adjacent stator chambers so that the abutments are alternately displaced. The fulcrums 19 for the levers 18 are adjusted radially in the spacer plate 6' through micrometer screw threads 19' engaging coacting screw threads in the spacer plate 6'. When the fulcrums 19 have been set in the desired position for pivoting the levers 18 on the pivot points 19'' which fit into recesses 18'' in levers 18, the fulcrums are locked in set position by screw members 20 which engage the screw threaded ends 19''' of the fulcrums 19 for selectively setting the fulcrums in a predetermined position. Adjustment may be made of the positions of the fulcrums for obtaining most efficient results. Again, the fulcrums may be resiliently mounted on springs or rubber blocks to provide tolerances and allow for any inaccuracy in the manufacture. Alternatively the levers 18 themselves may be in the form of flat springs. It must be understood that the mechanical interconnecting of the abutments may be used in conjunction with the hydraulic interconnecting of the abutments already described.

The contour of the abutment face in contact with the rotor is very important. Figs. 9–11 show the various conditions encountered in the operation of a pump or motor embodying our invention and Fig. 12 shows the manner of laying out the contour of the rotor. On account of the varying rotor profile only line contact is possible and it is essential that this line of contact must remain practically constant in relation to the abutment face. If the line of contact were allowed to travel backwards and forwards across the abutment face it would upset the reciprocal rates of acceleration and deceleration of the abutments and it would then become impossible to maintain continuous contact between the abutments and the rotors as illustrated for example in Fig. 9. Because reciprocal rates of acceleration and deceleration govern the movements of the abutments it follows that the total cubic capacity of the combined spaces at the outer ends of the abutments remains practically constant. The pressure in these spaces must inevitably build up to approximately the pump delivery pressure and this pressure is felt over the areas of the outer faces of the abutments forcing them against the rotor. If there were no reaction to this pressure excessive wear would take place between rotors and abutments at high hydraulic pressures. By arranging the contour of the inner face of an abutment 10 so that the line of contact 10a is close to that face which is adjacent to the inlet porting 14 of the pump, a reactive pressure is exerted on the abutment which reduces the resultant pressure between the abutment and the rotor to a minimum as represented in Fig. 9.

Another important feature of our construction deals with those portions of the stator bore which lie between the abutment slots and the inlet ports. It is necessary to relieve these areas so that the major radius arcuate portion of the rotor cannot form a seal between the slot and the inlet port. If this sealing were allowed to take place small pockets would be isolated at the end of the abutments which would become reduced in capacity as the abutment moved inwards thus exerting a heavy pressure tending to separate the abutments from the rotors as represented in Figs. 10 and 11.

In Fig. 12 we have shown the manner of laying out the contour of the rotor and the proportions for the several curves whereby the ends of the major circular arc and the minor circular arc are interconnected by curves which effect a constant rate of acceleration for one half of the movement of the coacting abutment and a constant rate of deceleration for the second half of the movement of the abutment. The proportions have been represented in Fig. 12 and are as follows:

$A$ = Angular length of each circular arc in degrees
$R$ = Radius of major circular arc
$r$ = Radius of minor circular arc
$R_m$ = Radius at 45 degrees to a radial line bisecting either adjacent circular arc
$R_L$ = Radius at L degrees from end of major circular arc
$r_L$ = Radius at L degrees from end of minor circular arc.

The following equations govern the proportions in which the contours are formed:

$$R_m = \frac{R+r}{2}$$

$$R_L = R - \frac{R-R_m}{\left(\frac{90-A}{2L}\right)^2}$$

$$r_L = r + \frac{R-R_m}{\left(\frac{90-A}{2L}\right)^2}$$

$$R + r = R_L + r_L$$

We have found the mathematical formula set forth herein highly practicable in producing efficient pump and motor equipment. We realize however, that modifications may be made and we desire that it be understood that no limitations upon our invention are intended other than may be imposed by the scope of the appended claims.

What we claim as new and desire to secure by Letters Patent of the United States, is as follows:

1. A device of the class described comprising a casing for fluid including a series of stator chambers, a shaft extending therethrough, a series of rotors phase displaced at 90 degrees on said shaft, there being one rotor to each chamber aligned with the plane of the respective chamber, a division plate between said chambers, inlet and outlet passages for directing fluid through said casing, said division plate, and said chambers, diametrically disposed slidable abutments extending from the casing through the stator chambers to the exterior peripheral face of said rotors, said rotors having their peripheries formed on major and minor circular arcs interconnected end to end on curves which are determined by points located according to the equations:

$$R_m = \frac{R+r}{2}$$

$$R_L = R - \frac{R-R_m}{\left(\frac{90-A}{2L}\right)^2}$$

$$r_L = r + \frac{R-R_m}{\left(\frac{90-A}{2L}\right)^2}$$

$$R + r = R_L + r_L$$

wherein $A$ = Angular length of each circular arc in degrees
$R$ = Radius of major circular arc
$r$ = Radius of minor circular arc
$R_m$ = Radius at 45 degrees to a radial line bisecting either adjacent circular arc
$R_L$ = Radius at L degrees from end of major circular arc
$r_L$ = Radius at L degrees from end of minor circular arc
$L$ = Distance in degrees from end of major and minor circular arcs.

2. A device of the class described comprising a casing for fluid including a series of stator chambers, a shaft extending therethrough, a series of rotors phase displaced at 90 degrees on said shaft, there being one rotor to each chamber aligned with the plane of the respective chamber, a division plate between said chambers, inlet and outlet passages for directing fluid through said casing, said division plate, and said chambers, diametrically disposed slidable abutments extending between the outer periphery of said stator chambers and the exterior peripheral face of said rotors, said rotors having their peripheries formed on major and minor circular arcs interconnected end to end by a curve, said curve forming a constant acceleration path from one of said arcs to the mid point of said curve and a constant deceleration path from said mid point of said curve to the other of said arcs where the mid point of said curve has a radius which is equal to the sum of the radii of said major and minor circular arcs divided by two.

3. A device of the class described comprising a casing for fluid including a series of stator chambers, a shaft extending therethrough, a series of rotors phase displaced at 90 degrees on shaft, there being one rotor to each chamber aligned with the plane of the respective chamber, a division plate between said chambers, inlet and outlet passages for directing fluid through said casing, said division plate, and said chambers, diametrically disposed slidable abutments extending from the casing through the stator chambers to the exterior peripheral face of said rotors, said rotors having their peripheries formed on major and minor circular arcs interconnected end to end on a curve having the portion thereof between said major arc and the mid point of the curve extending in a path for providing constant radial acceleration for said abutments and the other portion thereof between said mid point and said minor arc extending in a path providing constant radial de-acceleration for said abutments, said last mentioned portions of the said curves being joined at a point disposed on a radius equal to the sum of the radii of said major and minor circular arcs divided by two.

4. A device of the class described comprising a casing for fluid including a series of stator chambers, a shaft extending therethrough, a series of rotors phase-displaced at 90 degrees on said shaft, there being one rotor to each chamber aligned with the plane of the respective chamber, diametrically opposed slidable abutments extending from the casing through the stator chambers to the exterior peripheral face of the rotors, said rotors having their peripheries formed on major and minor circular arcs interconnected end to end on a joining curve having one portion thereof extending in a constant radial acceleration path and another portion extending in a constant radial deceleration path, said joining curve being determined so that all radii disposed L degrees from the end of the minor circular arc are determined by the equation:

$$r_L = r + \frac{R - R_m}{\left(\frac{90 - A}{2L}\right)^2}$$

and $L°$ from the end of the major circular arc is determined by the equation:

$$R_L = R - \frac{R - R_m}{\left(\frac{90 - A}{2L}\right)^2}$$

wherein $A$ = Angular length of each circular arc in degrees.
$R$ = Radius of major circular arc
$r$ = Radius of minor circular arc
$R_m$ = Radius at 45 degrees to a radial line bisecting either adjacent circular arcs.
$r_L$ = Radius at L degrees from end of minor circular arc.
$R_L$ = Radius at L degrees from end of major circular arc.

CHARLES SCOTT PRENDERGAST.
RICHARD SAMUEL PRENDERGAST.
GODFREY WILLIAM BEAUMONT DIXEY.
HAMILTON GORDON.

REFERENCES CITED

The following references are of record in the file of this patent:

UNITED STATES PATENTS

| Number | Name | Date |
|---|---|---|
| 2,013,397 | Balsiger | Sept. 3, 1935 |